US009311928B1

(12) United States Patent
Avargel et al.

(10) Patent No.: US 9,311,928 B1

(45) Date of Patent: Apr. 12, 2016

(54) METHOD AND SYSTEM FOR NOISE REDUCTION AND SPEECH ENHANCEMENT

(71) Applicant: VOCALZOOM SYSTEMS LTD., Yokneam (IL)

(72) Inventors: Yekutiel Avargel, Nir Galim (IL); Mark Raifel, Raanana (IL)

(73) Assignee: VOCALZOOM SYSTEMS LTD., Yokneam (IL)

( * ) Notice: Subject to any disclaimer, the term of this patent is extended or adjusted under 35 U.S.C. 154(b) by 0 days.

(21) Appl. No.: 14/608,372

(22) Filed: Jan. 29, 2015

Related U.S. Application Data

(60) Provisional application No. 62/075,967, filed on Nov. 6, 2014.

(51) Int. Cl.

*G10L 15/20* (2006.01)

*G10L 21/0208* (2013.01)

(52) U.S. Cl.

CPC ... *G10L 21/0208* (2013.01); *G10L 2021/02087* (2013.01)

(58) Field of Classification Search

CPC ........... A61M 2205/3375; A61M 2005/14268; A61B 5/6833; A61B 2560/0412; A61B 5/0024; A61B 2562/0204; A61B 5/0004; A61B 5/02007; G10K 2210/10; H04R 1/028

USPC ........ 704/233; 381/71.3, 71.4, 71.5, 94.1, 58, 381/71.1, 71.7; 360/246; 711/111, 112

See application file for complete search history.

(56) References Cited

U.S. PATENT DOCUMENTS

| | | | | |
|---|---|---|---|---|
| 5,689,572 | A * | 11/1997 | Ohki | G10K 11/1786 381/71.3 |
| 8,085,948 | B2 * | 12/2011 | Thomas | G10K 11/16 318/400.23 |
| 9,163,853 | B2 * | 10/2015 | Fujiwara | F24F 1/06 |
| 2009/0271187 | A1 | 10/2009 | Yen et al. | |
| 2012/0027218 | A1 | 2/2012 | Every et al. | |

(Continued)

FOREIGN PATENT DOCUMENTS

| | | |
|---|---|---|
| WO | 03096031 | 11/2003 |

OTHER PUBLICATIONS

Martin Graciarena et al, "Combining Standard and Throat Microphones for Robust Speech Recognition"IEEE Signal Processing Letters, vol. 10, No. 3, pp. 72-74 (Mar. 2003).

(Continued)

*Primary Examiner* — Charlotte M Baker

(74) *Attorney, Agent, or Firm* — Eitan, Mehulal & Sadot

(57) ABSTRACT

System and method for producing enhanced speech data associated with at least one speaker. The process of producing the enhanced speech data comprises: receiving distant signal data from a distant acoustic sensor; receiving proximate signal data from a proximate acoustic sensor located closer to the speaker than the distant acoustic sensor; receiving optical data originating from an optical unit configured for optically detecting acoustic signals in an area of the speaker and outputting data associated with speech of the speaker; processing the distant and proximate signals data for producing a speech reference and a noise reference; operating an adaptive noise estimation module, which identifies stationary and/or transient noise signal components, using the noise reference; and operating a post filtering module, which uses the optical data, speech reference and identified noise signal components for creating an enhanced speech data.

17 Claims, 3 Drawing Sheets

(56) References Cited

U.S. PATENT DOCUMENTS

| | | | |
|---|---|---|---|
| 2013/0246062 | A1 | 9/2013 | Avargel et al. |
| 2014/0149117 | A1 | 5/2014 | Bakish et al. |

OTHER PUBLICATIONS

Tomas Dekens et al, "Improved Speech Recognition in Noisy Environments by Using a Throat Microphone for Accurate Voicing Detection" 18th European Signal Processing Conference (EUSIPCO-2010), pp. 1-5, (Aug. 2010).

Yekutiel Avargel et al: "Speech measurements using a laser doppler vibrometer sensor: Application to speech enhancement" Conference: Hands-Free Speech Communication and Microphone Arrays—HSCMA , (May 2011).

Yekutiel Avargel et al; "Robust Speech Recognition Using an Auxiliary Laser-Doppler Vibrometer Sensor," in Proc. Speech Process, Conf., Tel-Aviv, Israel, , (Jun. 2011).

Israel Cohen et al,"An Integrated Real-Time Beamforming and Postfiltering System for Nonstationary Noise Environments", EURASIP Journal on Applied Signal Processing 11, pp. 1064-1073, (Sep. 2003).

Israel Cohen et al; "Speech enhancement for non-stationarynoise environments" Signal Processing 81 pp. 2403-2418, (Feb. 2001).

Israel Cohen "Noise Spectrum Estimation in Adverse Environments: Improved Minima Controlled Recursive Averaging", IEEE Transactions on Speech and Audio Processing, vol. 11, No. 5, pp. 466-475, (Sep. 2003).

Jianfeng Chen et al, "Theoretical Comparisons of Dual Microphone Systems" ICASSP, (2004).

Cohen et al,"An Integrated Real-Time Beamforming and Postfiltering System for Nonstationary Noise Environments", EURASIP Journal on Applied Signal Processing, 2003; pp. 1064-1073, (Jan. 31, 2003).

International Search Report for application PCT/IB2015/057250 dated Jan. 21, 2016.

* cited by examiner

METHOD AND SYSTEM FOR NOISE REDUCTION AND SPEECH ENHANCEMENT

CROSS-REFERENCE TO RELATED PATENT APPLICATIONS

This application claims priority from Provisional U.S. patent application No. 62/075,967 filed on Nov. 6, 2014, which is incorporated herein by reference in its entirety.

FIELD OF THE INVENTION

The present invention generally relates to methods and systems for reducing noise from acoustic signals and more particularly to methods and systems for reducing noise from acoustic signals for speech detection and enhancement.

BACKGROUND OF THE INVENTION

Recently, several approaches for improved speech enhancement and recognition have been proposed, which make use of auxiliary non-acoustic sensors, such as bone- and throat-microphones (see Graciarena et al., 2003 and Dekens et al., 2010). Although being immune to ambient acoustic interferences, a major drawback of such existing sensors is the requirement to have physical contact between the sensor and the speaker.

SUMMARY OF THE INVENTION

According to some embodiments of the invention, there is provided a method for reducing noise from acoustic signals for producing enhanced speech data associated therewith. In some embodiments, the method comprises: (a) receiving distant signal data from at least one distant acoustic sensor; (b) receiving proximate signal data of the same time domain from at least one other proximate acoustic sensor located closer to a speaker than the at least one distant acoustic sensor; (c) receiving optical data of the same time domain originating from at least one optical sensor configured for optically detecting acoustic signals in an area of the speaker and outputting data associated with speech of the speaker; (d) processing the distant signal data and the proximate signal data for producing a speech reference and a noise reference of the time domain; (e) operating an adaptive noise estimation module, which uses at least one adaptive filter for updating and improving accuracy of the noise reference by identification of stationary and transient noise by using the optical data in addition to the proximate and distant signal data for outputting an updated noise reference; and (f) producing an enhanced speech data by deducting the updated noise reference from the speech reference.

According to some embodiments, the optical data is indicative of speech and non-speech and/or voice activity related frequencies of the acoustic signal as detected by the at least one optical sensor. For instance, the optical data is indicative of voice activity and pitch of the speaker's speech, wherein the optical data is obtained by using voice activity detection (VAD) and pitch detection processes.

In some embodiments, the method further comprises operating a post filtering module, being configured for further reducing residual-noise components and for updating the at least one adaptive filter used by the adaptive noise estimation module, the post filtering module receives the optical data and processes it to identify transient noise by identification of speech and non-speech and/or voice activity related frequencies of the acoustic signal as detected by the at least one optical sensor.

Additionally or alternatively to the above, the method further comprises a preliminary stationary noise reduction process comprising the steps of: detecting stationary noise at the proximate and distant acoustic sensors; and reducing stationary noise from the proximate signal data and distant signal data. In this case, the preliminary stationary noise reduction process is carried out before step (d) of processing of the distant and proximate signal data.

Optionally, the preliminary stationary noise reduction process is carried out using at least one speech probability estimation process. In some embodiments, the preliminary stationary noise reduction process is carried out using optimal modified mean-square error Log-spectral amplitude (OMLSA) based algorithm.

Optionally, the speech reference is produced by superimposing the proximate data to the distant data, and the noise reference is produced by subtracting the distant data from the proximate data.

Additionally or alternatively, the method further comprises operating a short term Fourier transform (STFT) operator over the noise and speech references, wherein the adaptive noise reduction module uses the transformed references for the noise reduction process; and inversing the transformation using inverse STFT (ISTFT) for producing the enhanced speech data.

Optionally, the method further comprises outputting an enhanced acoustic signal using the enhanced speech data, which is a noise reduced speech acoustic signal, using at least one audio output device.

Additionally or alternatively, all steps of the method are carried out in real time or near real time.

According to some embodiments of the invention, there is provided a system for reducing noise from acoustic signals for producing enhanced speech data associated therewith, wherein the system comprises: (a) at least one distant acoustic sensor outputting distant signal data; (b) at least one other proximate acoustic sensor located closer to a speaker than the at least one distant acoustic sensor, the proximate acoustic sensor outputs proximate signal data; (c) at least one optical sensor configured for optically detecting acoustic signals in an area of the speaker and outputting optical data associated therewith; and (d) at least one processor operating modules configured for processing received data from the acoustic and optical sensors for enhancing speech of a speaker in the area thereof.

In some embodiments, the processor operates modules specifically configured for: (i) receiving proximate data, distant data and optical data from the acoustic and optical sensors; (ii) processing the distant signal data and the proximate signal data for producing a speech reference and a noise reference of the time domain; (iii) operating an adaptive noise estimation module, which uses at least one adaptive filter for updating and improving accuracy of the noise reference by identification of stationary and transient noise by using the optical data in addition to the proximate and distant signal data for outputting an updated noise reference; and (iv) producing an enhanced speech data by deducting the updated noise reference from the speech reference.

Optionally, the at least one proximate acoustic sensor comprises a microphone and the at least one distant acoustic sensor comprises a microphone.

Additionally or alternatively, the at least one optical sensor comprises a coherent light source and at least one optical detector for detecting vibrations of the speaker related to the speaker's speech through detection of reflection of transmitted coherent light beams.

In some embodiments, the acoustic proximate and distant sensors and the at least one optical sensor are positioned such each is directed to the speaker.

Optionally, the optical data is indicative of speech and non-speech and/or voice activity related frequencies of the acoustic signal as detected by the optical sensor. The optical data may specifically be indicative of voice activity and pitch of the speaker's speech, the optical data is obtained by using voice activity detection (VAD) and pitch detection processes.

The system optionally further comprises a post filtering module configured for identifying residual noise and updating the at least one adaptive filter used by the adaptive noise estimation module, by receiving the optical data and processing it to identify transient noise by identification of speech and non-speech and/or voice activity related frequencies of the acoustic signal as detected by the optical sensor.

DETAILED DESCRIPTION OF SOME EMBODIMENTS OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides systems and methods, which use auxiliary one or more non-contact optical sensors for improved noise reduction and speech recognition, such as sensors described in Avargel et al., 2011A; in Avargel et al., 2011B, Avargel et al., 2013 and in Bakish et al., 2014. The speech enhancement process of the present invention efficiently uses multiple acoustic sensors such as acoustic microphones located in a predefined area of a speaker at different distances in respect to the speaker and one or more optical sensors located in proximity to the speaker yet not necessarily in contact with the speaker's skin, for improved noise reduction and speech recognition. In some embodiments, the output of this noise reduction and speech enhancement process is an enhanced noise-reduced acoustic signal data indicative of speech of the speaker.

The data from the acoustic sensors is first processed to create speech and noise references and the references are used in combination with data from the optical sensor to perform an advanced noise reduction and speech recognition to output data indicative of a significantly noise-reduced acoustic signal representing only the speech of the speaker.

Figure 1:
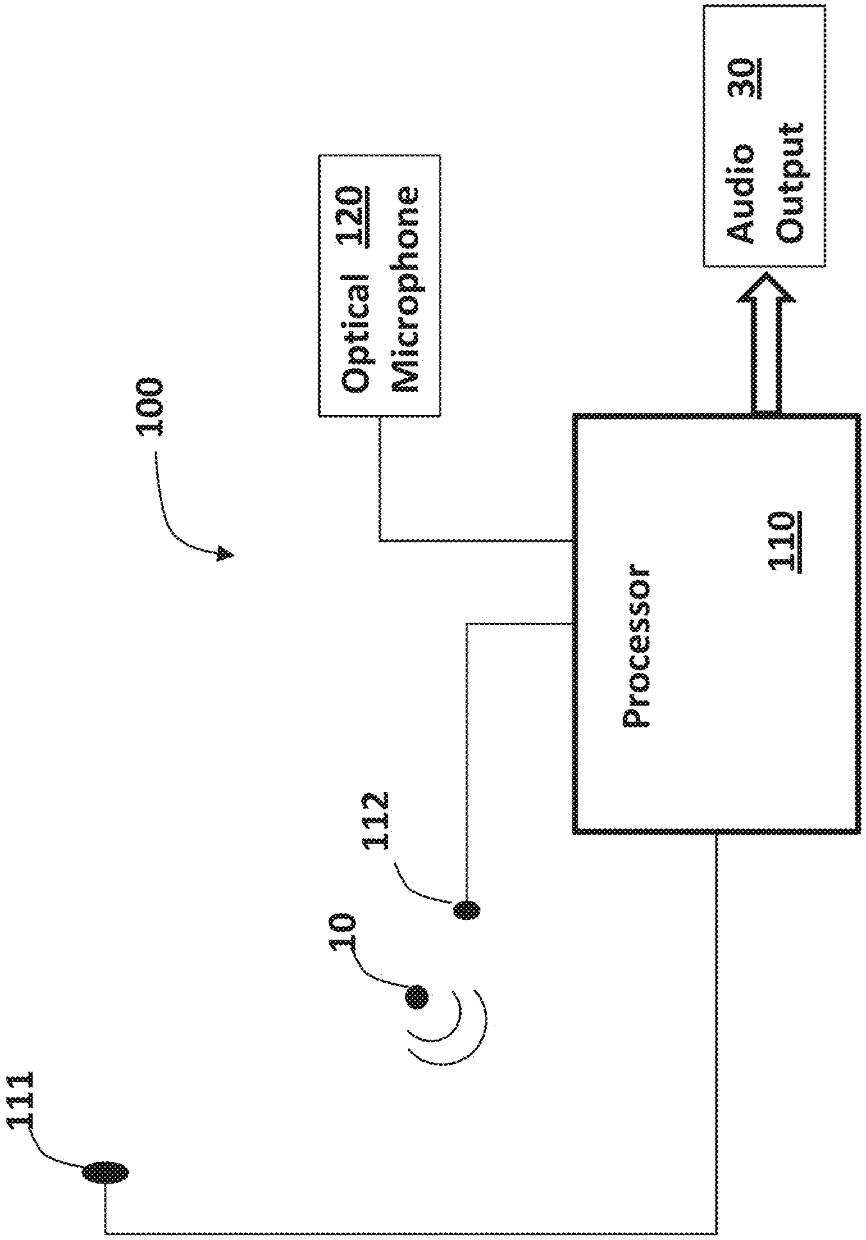
FIG. 1 is a schematic illustration of a system for noise reduction and speech enhancement having one proximate microphone, one distant microphone and one optical sensor located in a predefined area of a speaker, according to some embodiments of the invention.

Reference is now made to FIG. 1, schematically illustrating a system 100 for noise reduction and speech enhancement of speech acoustic signals originating from a speaker 10 in a predefined area, according to some embodiments of the invention. The system 100 uses at least three sensors: at least one proximate acoustical sensor such as a proximate microphone 112 preferably located in proximity to the speaker 10, at least one distant acoustical sensor such as a distant microphone 111 located at larger distance from the speaker 10 than the proximate microphone 112, and at least one optical sensor unit 120 such as an optical microphone, which is preferably directed to the speaker 10. The system 100 additionally comprises one or more processors such as processor 110 for receiving and processing the data arriving from the distant and proximate microphones 111 and 112, respectively, and from the optical sensor unit 120 to output a dramatically noise-reduced audio signal data which is an enhanced speech data of the speaker 10. This means that the system 100 is configured mainly for enhancing speaker's speech related signals by operating one or more highly advanced noise reduction and voice activity detection (VAD) processes using the data from the sensors of 111, 112 and 120 and using the relative localization of the acoustic sensors 111 and 112.

According to some embodiments, the optical sensor unit 120 is configured for optically measuring and detecting speech related acoustical signals and output data indicative thereof. For example, a laser based optical microphone having a coherent source and an optical detector with a processor unit enabling extracting the audio signal data using extraction techniques such as vibrometry based techniques such as Doppler based analysis or interference patterns based techniques. The optical sensor, in some embodiments, transmits a coherent optical signal towards the speaker and measures the optical reflection patterns reflected from the vibrating surfaces of the speaker. Any other sensor type and technique may be used for optically establishing the speaker(s)'s audio data.

In some embodiments the optical sensor unit 120 comprises a laser based optical source and an optical detector and merely outputs a raw optical signal data indicative of detected reflected light from the speaker or other reflecting surfaces. In these cases, the data is further processed at the processor 110 for deducing speech signal data from the optical sensor e.g. by using speech detection and VAD processes (e.g. by identification of speaker's voice pitches). In other cases the sensor unit includes a processor that allows carrying out at least part of the processing of the detector's output signals. In both cases the optical sensor unit 120 allows deducing a speech related optical data shortly referred to herein as "optical data".

The output signal from the distant and proximate sensors e.g. from the distant and proximate microphones 111 and 112, respectively, may first be processed through a preliminary noise-reduction process. For example, a stationary noise-reduction process may be carried out to identify stationary noise components and reducing them from the output signals of each acoustic sensor (e.g. microphones 111 and 112). In other embodiments, the stationary noise may be identified and reduced by using one or more speech probability estimation processes such as optimal modified mean-square error Log-spectral amplitude (OMLSA) algorithms or any other noise reduction technique for acoustic sensors output known in the art.

The distant and proximate sensors' audio data (whether improved by the initial noise reduction process or the raw output signal of the sensors), shortly referred to herein as the distant audio data and proximate audio data, respectively, are processed to produce: a speech reference, which is a data packet such as an array or matrix indicative of the speech signal; and a noise reference, which is a data packet such as an array or matrix indicative of the speech signal of the same time domain as that of the speech signal.

The noise reference is then further processed and improved through an adaptive noise estimation module and the improved noise reference is then used along with the data from the optical sensor unit 120 to further reduce noise from the speech reference using a post filtering module to output an enhanced speech data. The enhanced speech data can be outputted as an enhanced speech audio signal using one or more audio output devices such as a speaker 30.

According to some embodiments of the invention, the processing of the output signals of the sensors 111, 112 and 120 may be carried out in real time or near real time through one or more designated computerized systems in which the processor is embedded and/or through one or more other hardware and/or software instruments.

Figure 2:
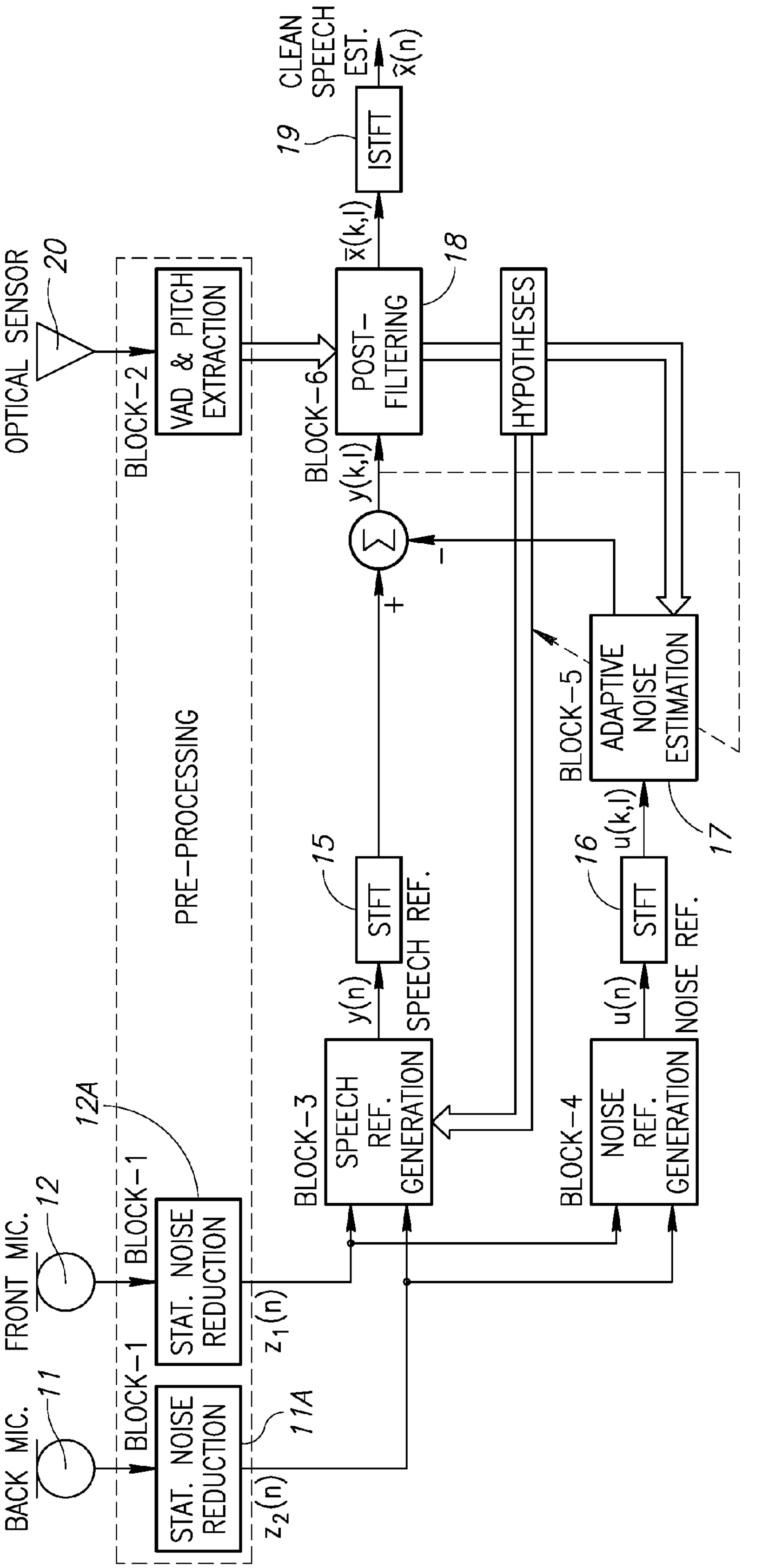
FIG. 2 is a block diagram schematically illustrating the operation of the system, according to some embodiments of the invention.

FIG. 2 is a block diagram schematically illustrating the algorithmic operation of the system, according to some embodiments of the invention. The process comprises four main parts: (i) a pre-processing part that slightly enhances the data originating from the distant and proximate microphones (Block 1) and extracts voice-activity detection (VAD) and pitch information from the optical sensor (Block 2); (ii) generation of a speech- and noise-reference signals (Blocks 3 and 4, respectively); (iii) adaptive-noise estimation (Block 5); and (iv) post-filtering procedure (Block 6) with post-filtering optionally using filtering techniques as described in Cohen et al., 2003A.

According to some embodiments, the output from the two acoustic sensors (proximate microphone 12 output thereof represented by $z_1$ (n) and distant microphone 11 output thereof represented by $z_2$ (n)) are first enhanced by a preliminary noise-reduction process (Block 1) using one or more noise reduction algorithms 11*a* and 12*a* operating blocks 3 and 4 for creating a speech reference and a noise reference from the initially noise-reduced outputs of the distant and proximate microphones 11 and 12. The speech reference is denoted by y(n) and the noise reference by u(n). These references (outputted as signals or data packets for instance) are further transformed to the time-frequency domain e.g. by using the short-time Fourier transform (STFT) operator 15/16. The transformed output of the noise reference signal is indicated by U(k,l). The transformed noise reference U(k,l) is further processed through an adaptive noise-estimation operator or module 17 to further suppress stationary and transient noise components from the transformed speech reference to output an initially enhanced speech reference Y(k,l). The speech reference transformed signal Y(k,l) is finally post-filtered by Block 6 using a post filtering module 18 using optical data from the optical sensor unit 20 to reduce residual noise components from the transformed speech reference. This block also incorporates information from the optical sensor unit such as VAD and pitch estimation, derived in Block 2 optionally for identification of transient (non-stationary) noise and speech detection. Accordingly, some hypothesis-testing is carried out in Block 6 to determine which category (stationary noise, transient noise, speech) a given time-frequency bin belongs to. These decisions are also incorporated into the adaptive noise-estimation process (Block 5) and the reference signals generation (Blocks 3-4). For instance, the optically-based hypothesis decisions are used as a reliable time-frequency VAD for improved extraction of the reference signals and estimation of the adaptive filters related to stationary and transient noise components. The resulting enhanced speech audio signal is finally transformed to the time domain via the inverse-STFT (ISTFT) 19, yielding $\hat{x}(n)$. In the next subsections, each block will be briefly explained.

Block 1: Stationary-noise reduction: In the first step of the algorithm, the pre-processing step, the proximate- and distant-microphone signals are slightly enhanced by suppressing stationary-noise components. This noise suppression is optional and may be carried out by using conventional OMLSA algorithmic such as described in Cohen et al., 2001. Specifically, a spectral-gain function is evaluated by minimizing the mean-square error of the log-spectra, under speech-presence uncertainty. The algorithm employs a stationary-noise spectrum estimator, obtained by the improved minima controlled recursive averaging (IMCRA) algorithm such as described in Cohen et al., 2003B, as well as signal to noise ratio (SNR) and speech-probability estimators for evaluating the gain function. The enhancement-algorithm parameters are tuned in a way that noise is reduced without compromising for speech intelligibility. This block functionality is required for successively producing reliable speech- and noise-reference signals for Blocks 3 and 4.

Block 2: VAD and Pitch Extraction: This block, a part of the pre-processing step, attempts to extract as much information as possible from the output data of the optical sensor unit 20. Specifically, according to some embodiments, the algorithm inherently assumes the optical signal is immune to acoustical interferences and detects the desired-speaker's pitch frequency by searching for spectral harmonic patterns using for example a technique described in Avargel et al., 2013. The pitch tracking is accomplished by an iterative dynamic-programming-based algorithm, and the resulting pitch is finally used to provide soft-decision voice-activity detection (VAD).

Block 3: Speech-reference signal generation: According to some embodiments, this block is configured for producing a speech-reference signal by nulling-out coherent-noise components, coming from directions that differ from that of the desired speaker. The block consists of a possible different superposition of outputs or improved outputs (after preliminary stationary noise reduction) originating from the proximate and distant microphones 12 and 11, respectively, like beam forming, proximate-cardioid, proximate super-cardioid, and etc.

Block 4: Noise-reference signal generation: This block aims at producing a noise-reference signal by nulling-out coherent-speech components, coming from the desired speaker directions, for example by making use of appropriate delay and gain, the distant-cardioid polar pattern can be generated (see Chen et al., 2004). Consequently, the noise-reference signal may consist mostly of noise.

Block 5: Adaptive-noise estimation: This block is utilized in the STFT domain and is configured for identifying and eliminating both stationary and transient noise components that leak through the side-lobes of the fixed beam-forming (Block 3). Specifically, at each frequency bin, two or more sets of adaptive filters are defined: a first set of filters corresponds to the stationary-noise components, whereas the second set of filters is related to transient (non-stationary) noise components. Accordingly, these filters are adaptively updated based on the estimated hypothesis (stationary or transient; derived in Block 6), using the normalized least mean square (NLMS) algorithm. The output of these sets of filters is then subtracted from the speech reference signal at each individual frequency, yielding the partially or initially-enhanced speech reference signal Y(k,l) in the STFT domain.

Block 6: Post-filtering: this module is used to reduce residual noise components by estimating a spectral-gain function that minimizes the mean-square error of the log-spectra, under speech-presence uncertainty (see Cohen et al., 2003B). Specifically, this block uses the ratio between the improved speech-reference signal (after adaptive filtering) and noise-reference signal in order to properly distinguish between each of the hypotheses—stationary noise, transient noise, and desired speech—at a given time-frequency domain. To attain a more reliable hypothesis decision, a priori speech information (activity detection and pitch frequency) from the optical signal (Block 2) is also incorporated. This hypothesis testing, combined with the optical information, is employed to attain an efficient SNR and speech-probability estimators, as well as background noise power spectral density (PSD) estimation (for both stationary and transient components). The resulting estimators are then used in evaluating the optimal spectral-gain G(k,l), which in turns yields the clean desired-speaker's STFT estimator via:

$$\hat{X}(k,l)=G(k,l)Y(k,l)$$

Finally, applying the inverse STFT (ISTFT), we obtain the time-domain desired speaker estimator $\hat{x}(n)$, which is indicative of the enhanced audio signal data of the speech of the speaker.

Figure 3:
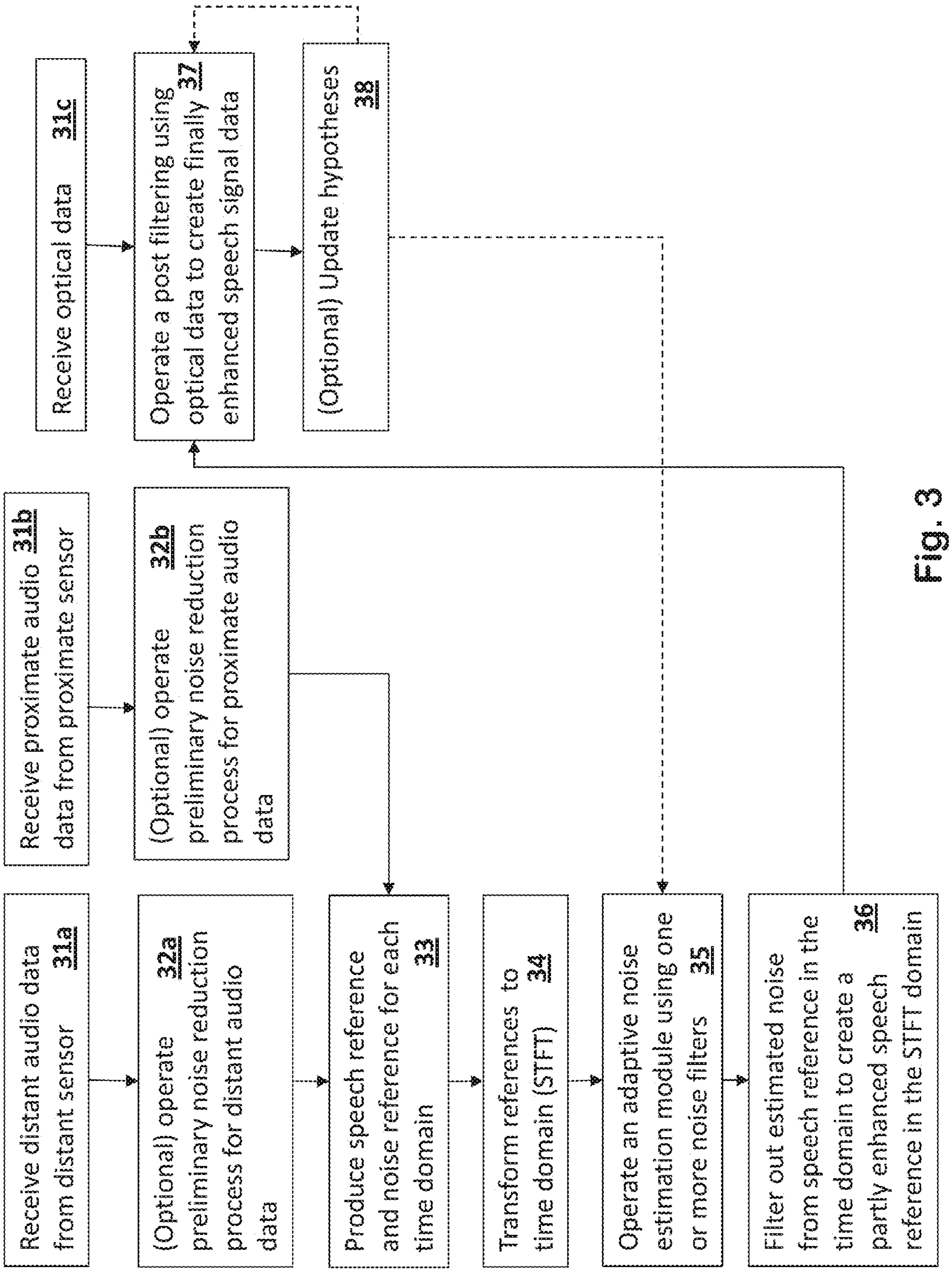
FIG. 3 is a flowchart, schematically illustrating a process of noise reduction and speech enhancement, according to some embodiments of the invention.

Reference is now made to FIG. 3, which is a flowchart schematically illustrating a method for noise reduction and speech enhancement, according to some embodiments of the invention. The process includes the steps of: receiving data/signals from a distant acoustic sensor (step 31*a*), receiving data/signals from a proximate acoustic sensor (step 31*b*) and receiving data/signals from an optical sensor unit (step 31*c*) all indicative of acoustics of a predefined area for detection of a speaker's speech, wherein the distant acoustic sensor is located at a farther distance from the speaker than the proximate acoustic sensor. Optionally, the acoustic sensors' data is processed through a preliminary noise reduction process as illustrated in steps 32*a* and 32*b*, e.g. by using stationary noise reduction operators such as OMLSA.

The raw signals from the acoustic sensors or the stationary noise reduced signals originating from the acoustic sensors are then processed to create a noise reference and a speech reference. Both sensors' data is taken into consideration for calculation of each reference. For example, to calculate the speech reference signal, the proximate and distant sensors are properly delayed and summed such that noise components from directions that differ from that of the desired speaker are substantially reduced. The noise reference is generated in a similar manner with the only difference being that the coherent speaker is now to be excluded by proper gains and delays of the proximate and distant sensors.

Optionally, the noise and speech reference signals are transformed to the frequency domain e.g. via STFT (step 34) and the transformed signals data referred to herein as speech data and noise data are further processed for refining the noise components identification e.g. for identifying non-stationary (transient) noise components as well as additional stationary noise components using an adaptive noise estimation module (e.g. algorithm) (step 35). The adaptive noise estimation module uses one or more filters to calculate the additional noise components such a first filter which calculates the stationary noise components and a second filter that calculates the non-stationary transient noise components using the noise reference data (i.e. the transformed noise reference signal) in a calculation algorithmic that can be updated by a post filtering module that takes into account the optical data from the optical unit (step 31*c*)and the speech reference data. The additional noise components are then filtered out to create a partially enhanced speech reference data (step 36).

The partially enhanced speech reference data is further processed through a post filtering module (step 37), which uses optical data originating from the optical unit. In some embodiments, the post filtering module is configured for receiving speech identification (such as speaker's pitch identification) and VAD information from the optical unit or for identifying speech and VAD components using raw sensor data originating from the detector of the optical unit. The post filtering module is further configured for receiving the speech reference data (i.e. the transformed speech reference) and enhancing thereby the identification of speech related components.

The post filtering module ultimately calculates and outputs a final speech enhanced signal (step 37) and optionally also updates the adaptive noise estimation module for the next processing of the acoustic sensors data relating to the specific area and speaker therein.

The above-described process of noise reduction and speech detection for producing enhanced speech data of a speaker may be carried out in real time or near real time.

The present invention may be implemented in other speech recognition systems and methods such as for speech content recognition algorithms i.e. words recognition and the like and/or for outputting a cleaner audio signal for improving the acoustic quality of the microphones output using an acoustic/audio output device such as one or more audio speakers.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

REFERENCES

[1]. M. Graciarena, H. Franco, K. Sonmez, and H. Bratt, "Combining standard and throat microphones for robust speech recognition," IEEE Signal Process. Lett., vol. 10, no. 3, pp. 72-74, March 2003.

[2]. T. Dekens, W. Verhelst, F. Capman, and F. Beaugendre, "Improved speech recognition in noisy environments by using a throat microphone for accurate voicing detection," in 18th European Signal Processing Conf. (EUSIPCO), Aallborg, Denmark, August 2010, pp. 23-27.

[3]. Y. Avargel and I. Cohen, "Speech measurements using a laser Doppler vibrometer sensor: Application to speech enhancement," in Proc. Hands-free speech comm. and mic. Arrays (HSCMA), Edingurgh, Scotland, May 2011 A.

[4]. Y. Avargel, T. Bakish, A. Dekel, G. Horovitz, Y. Kurtz, and A. Moyal, "Robust Speech Recognition Using an Auxiliary Laser-Doppler Vibrometer Sensor," in Proc. Speech Process, Conf., Tel-Aviv, Israel, June 2011 B.

[5] Y. Avargel and Tal Bakish, "System and Method for Robust Estimation and Tracking the Fundamental Frequency of Pseudo Periodic Signals in the Presence of Noise," US/2013/0246062 A1, 2013.

[6] T. Bakish, G. Horowitz, Y. Avargel, and Y. Kurtz, "Method and System for Identification of Speech Segments," US2014/0149117 A1, 2014.

[7]. I. Cohen, S. Gannot, and B. Berdugo, "An Integrated Real-Time Beamforming and Postfiltering System for Nonstationary Noise Environments," EURASIP Journal on Applied Signal Process., vol. 11, pp. 1064-1073, January 2003A.

[8]. I. Cohen and B. Berdugo, "Speech enhancement for nonstationary noise environment," Signal Process., vol. 81, pp. 2403-2418, November 2001.

[9]. I. Cohen, "Noise spectrum estimation in adverse environments: Improved minima controlled recursive averaging," IEEE Trans. Speech Audio Process., vol. 11, no. 5, pp. 466-475, September 2003B.

[10] J. Chen, L. Shue, K. Phua, and H. Sun, "Theoretical Comparisons of Dual Microphone Systems," ICASSP, 2004.

The invention claimed is:

1. A method for producing enhanced speech data associated with at least one speaker, said method comprising:

a) receiving distant signal data from at least one distant acoustic sensor;

b) receiving proximate signal data from at least one other proximate acoustic sensor located closer to said speaker than said at least one distant acoustic sensor;

c) receiving optical data originating from at least one optical unit configured for optically detecting acoustic signals in an area of said speaker and outputting data associated with speech of said speaker;

d) processing said distant signal data and said proximate signal data for producing a speech reference and a noise reference;

e) operating an adaptive noise estimation module configured for identifying stationary and/or transient noise signal components, said adaptive noise estimation module uses said noise reference; and f) operating a post filtering module, which uses said optical data, speech reference and the identified noise signal components from said adaptive noise estimation module for creating an enhanced speech reference data and outputting thereof.

2. The method according to claim 1, wherein said optical data is indicative of speech and non-speech and/or voice activity related frequencies of the acoustic signal as detected by said optical sensor.

3. The method according to claim 2, wherein said optical data is indicative of voice activity and pitch of the speaker's speech, said optical data is obtained by using voice activity detection (VAD) and pitch detection processes.

4. The method according to claim 1, wherein said post filtering module is further configured for updating said adaptive noise estimation module.

5. The method according to claim 1, wherein said method further comprises a preliminary stationary noise reduction process comprising the steps of:

detecting stationary noise of said proximate and distant acoustic sensors; and extracting stationary noise from the proximate signal data and distant signal data, wherein said preliminary stationary noise reduction process is carried out before step (d) of processing of said distant and proximate signal data.

6. The method according to claim 5, wherein said preliminary stationary noise reduction process is carried out using at least one speech probability estimation process.

7. The method According to claim 6, wherein said preliminary stationary noise reduction process is carried out using OMLSA based algorithm.

8. The method according to claim 1, wherein said speech reference is produced by superimposing said proximate data to said distant data, and said noise reference is produced by subtracting said distant data from said proximate data.

9. The method according to claim 1 further comprising operating a short term Fourier Transform (STFT) operator over the noise and speech references, wherein said adaptive noise reduction module and the post filtering module use the transformed references for the noise reduction process; and inversing the transformation using inverse STFT (ISTFT) for producing said enhanced speech data in the time domain.

10. The method of claim 1, wherein all steps thereof are carried out in real time or near real time.

11. A system producing enhanced speech data associated with at least one speaker, said system comprising:

a) at least one distant acoustic sensor outputting distant signal data;

b) at least one proximate acoustic sensor located closer to said speaker than said at least one distant acoustic sensor, said proximate acoustic sensor outputs proximate signal data;

c) at least one optical unit configured for optically detecting acoustic signals in an area of said speaker and outputting optical data associated therewith; and d) at least one processor operating modules configured for: receiving proximate data, distant data and optical data from the acoustic and optical sensors; processing said distant signal data and said proximate signal data for producing a speech reference and a noise reference of the time domain; operating an adaptive noise estimation module configured for identifying stationary and/or transient noise signal components, said adaptive noise estimation module uses said noise reference; and operating a post filtering module, which uses said optical data, speech reference and the identified noise signal components from said adaptive noise estimation module for creating an enhanced speech reference data and outputting thereof.

12. The system according to claim 11, wherein said proximate acoustic sensor comprises a microphone and said distant acoustic sensor comprises a microphone.

13. The system according to claim 11, wherein said optical unit comprises a coherent light source and at least one optical detector for detecting vibrations of the speaker related to the speaker's speech through detection of reflection of transmitted coherent light beams.

14. The system according to claim 11, wherein the proximate acoustic and distant sensors and the optical unit are positioned such each is directed to the speaker.

15. The system according to claim 11, wherein said optical data is indicative of speech and non-speech and/or voice activity related frequencies of the acoustic signal as detected by said optical sensor.

16. The system according to claim 11, wherein said optical data is indicative of voice activity and pitch of the speaker's speech, said optical data is obtained by using voice activity detection (VAD) and pitch detection processes.

17. The system according to claim 11, further comprising a post filtering module configured for identifying residual noise and updating said adaptive noise estimation module.

* * * * *